United States Patent Office 3,647,860
Patented Mar. 7, 1972

3,647,860
FLUORENE BIS-BASIC ESTERS
Arthur D. Sill and Robert W. Fleming, Cincinnati, Ohio, assignors to Richardson-Merrell Inc., New York, N.Y.
No Drawing. Filed Jan. 9, 1969, Ser. No. 790,171
Int. Cl. C07c 69/76
U.S. Cl. 260—475 FR
8 Claims

ABSTRACT OF THE DISCLOSURE

Novel fluorene and fluorenol bis-basic ester compounds, their method of preparation and use as antiviral agents. The compounds are of the formula

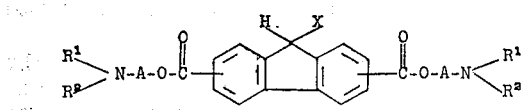

wherein:
(A) each of $R^1$ and $R^2$ is hydrogen, (lower) alkyl, cycloalkyl of 3 to 6 ring carbon atoms, alkenyl of 3 to 6 carbon atoms or each set of $R^1$ and $R^2$ taken together with the nitrogen to which they are attached is pyrrolidino, piperidino, N - (lower)alkylpiperazino or morpholino;
(B) each A is alkylene of 2 to about 8 carbon atoms and separates its adjacent oxygen and nitrogen atoms by an alkylene chain of at least 2 carbon atoms; and
(C) X is H or OH; or a pharmaceutically acceptable acid addition salt thereof.

This invention relates to novel fluorene and fluorenol bis-basic esters, their method of preparation and use. The compounds have a fluorene or fluorenol nucleus which is substituted with two aminoalkyleneoxycarbonyl groups. The novel compounds of this invention can be administered to warm-blooded animals in order to inhibit or prevent a viral infection.

The novel compounds of this invention can be represented by the formula

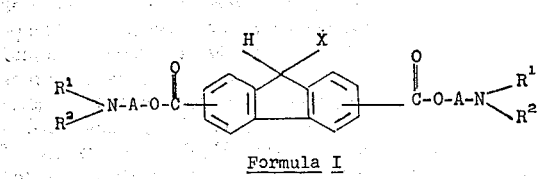

Formula I wherein: each of $R^1$ and $R^2$ is hydrogen, (lower) alkyl, cycloalkyl of 3 to 6 ring carbon atoms, alkenyl of 3 to 6 carbon atoms or each set of $R^1$ and $R^2$ taken together with the nitrogen to which it is attached is a saturated monocyclic heterocyclic group such as those generally equivalent to di(lower)alkylamino groups in the pharmaceutical arts; each A is alkylene of 2 to about 8 carbon atoms and separates its adjacent oxygen and nitrogen atoms by an alkylene chain of at least 2 carbon atoms; and X is hydrogen or hydroxyl. The novel compounds of this invention also include pharmaceutically acceptable acid addition salts of the base form shown in the structure of Formula I.

The compounds of this invention have a tricyclic ring or nucleus which is a fluorene when X in Formula I is hydrogen or a fluorenol when X is the hydroxyl group.

It can be seen from the above Formula I that one of the aminoalkyleneoxycarbonyl groups, or side chains, that is,

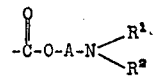

can be linked to the tricyclic ring by replacement of any of the four hydrogens of one of the benzenoid rings, and similarly, the second side chain is attached to the second benzenoid ring. Thus, one of the side chains can be in any of the positions of 1 through 4 of the tricyclic ring and the other can be in any of the positions 5 through 8. Preferably, the side chains are in the 2- and 7-positions, respectively, of the tricyclic ring.

Each amino group, i.e.,

of Formula I, can be a primary, secondary or tertiary amino group. Each of $R^1$ and $R^2$ can be hydrogen, (lower) alkyl, cycloalkyl of 3 to 6 ring carbon atoms, alkenyl of 3 to 6 carbon atoms, or each set of $R^1$ and $R^2$ taken together with the nitrogen atom to which they are attached is a saturated monocyclic heterocyclic group.

The term (lower) alkyl and (lower) alkoxy as used herein relates to such groups having from 1 to 6 carbon atoms.

Illustrative of (lower) alkyls as can be represented by each $R^1$ and $R^2$ there can be mentioned straight or branched chain alkyls such as: methyl; ethyl; n-propyl; isopropyl; n-butyl; secondary butyl; tertiary butyl; isoamyl; n-pentyl; n-hexyl; and the like. Illustrative of (lower) alkoxy groups there can be mentioned methoxy, ethoxy and the like.

Illustrative of cycloalkyl groups as represented by each $R^1$ and $R^2$ there can be mentioned: cyclopropyl; cyclobutyl; cyclopentyl; cyclohexyl; and the like.

When $R^1$ or $R^2$ represent alkenyl groups, the vinyl unsaturation is in other than the 1-position of said alkenyl group. Illustrative of alkenyl groups as can be represented by each of $R^1$ and $R^2$ there can be mentioned: allyl; 3-butenyl; 4-hexenyl; and the like.

Illustrative of heterocyclic groups as represented by $R^1$ and $R^2$, together with the nitrogen atom to which they are attached, there can be mentioned various saturated monocyclic heterocyclic groups such as those generally equivalent to di(lower)alkylamino groups in the pharmaceutical arts, e.g., pyrrolidino, piperidino, morpholino, N-(lower) alkylpiperazino such as N-methylpiperazino; N-ethylpiperazino; and the like.

Each of the alkylene groups as represented by A in the above generic Formula I is an alkylene group having from 2 to about 8 carbon atoms which can be straight chained or branched chained and which separates its adjacent oxygen from the amino nitrogen by an alkylene chain of at least two carbon atoms, i.e., the oxygen and amino nitrogen are not on the same carbon atom of the alkylene group. Each of the alkylene groups as represented by A can be the same or different. Preferably both of these groups are the same. Illustrative of alkylene groups are represented by A there can be mentioned: 1,2-ethylene; 1,3-propylene; 1,4-butylene; 1,5-pentylene;

1,6-hexylene; 2-methyl-1,4-butylene; 2-ethyl-1,4-butylene; 3-methyl-1,5-pentylene and the like. Preferably, A is alkylene having from 2 to 6 carbon atoms.

Preferred compounds of this invention are those of the formulas

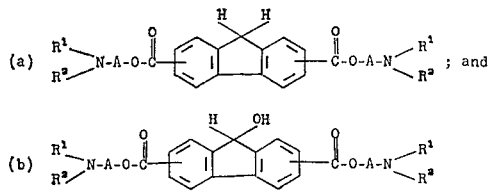

wherein: each of $R^1$ and $R^2$ is (lower) alkyl, cycloalkyl of 3 to 6 ring carbon atoms or alkenyl of 3 to 6 carbon atoms; and each A is alkylene of 2 to 6 carbon atoms which separates its adjacent oxygen and nitrogen by an alkylene chain of at least 2 carbon atoms; and particularly pharmaceutically acceptable acid addition salts thereof.

Salts of the base compounds of this invention are primarily pharmaceutically acceptable acid addition salts with inorganic or organic acids. Suitable inorganic acids are, for example, mineral acids, such as hydrohalic acids, e.g., hydrochloric or hydrobromic acid, or sulfuric or phosphoric acids. Organic acids are, for example, lower aliphatic hydroxy-hydrocarbon monocarboxylic acids, e.g., glycolic or lactic acid and the like, lower aliphatic lower alkoxy-hydrocarbon monocarboxylic acids, e.g., methoxy-acetic or ethoxy-acetic acids and the like, lower aliphatic lower alkanoyl-hydrocarbon monocarboxylic acids, e.g., pyruvic acid and the like, lower aliphatic hydrocarbon dicarboxylic acids, e.g., oxalic, malonic, succinic, methylsuccinic, dimethylsuccinic, glutaric, α-methylglutaric, β-methylglutaric, itaconic, maleic, citraconic, homocitraconic, or fumaric acid and the like, lower aliphatic hydroxy-hydrocarbon dicarboxylic acids, e.g., malic or tartaric acid and the like, lower aliphatic lower alkoxyhydrocarbon dicarboxylic acids, e.g., α,β-dimethoxysuccinic or ethoxymaleic acid and the like, lower aliphatic hydrocarbon tricarboxylic acids, e.g., aconitic or tricarballylic acid and the like, lower aliphatic hydroxyhydrocarbon tricarboxylic acids, e.g., citric acid and the like. Furthermore, organic sulfonic acids, such as lower alkene sulfonic acids, e.g., methane sulfonic or ethane sulfonic acid and the like, or lower hydroxy-alkane sulfonic acids, e.g., 2-hydroxy-ethane sulfonic acid and the like, can be used. Particularly useful are pharmacologically acceptable acid addition salts with mineral acids, e.g., hydrochloric acid. Mono- or di-acid salts may be formed; also, the salts can be hydrated, e.g., monohydrate, or substantially anhydrous.

The compounds of this invention can be used as antiviral agents for inhibiting or preventing a variety of viral infections by administering such a compound to an infected warm-blooded animal, e.g., a mammal, or to such animal prior to infection. Illustratively, the compounds can be administered to prevent or inhibit infections of picornaviruses, e.g., encephalomyocarditis, myxoviruses, arboviruses and poxviruses. When administered prior to infection, i.e., prophylactically, it is preferred that the administration be within 24 or 48 hours prior to infection of the animal with pathogenic virus. When administered therapeutically, it is preferred that the administration be within about 24 or 48 hours after infection with pathogenic virus.

The dosage administered will be dependent upon the virus for which treatment or prophylaxis is desired, the type of animal involved, and similar considerations. Generally, a daily dosage of the active ingredient can be from about 0.1 to 250 mg. (milligrams) per kg. (kilogram) of body weight and preferably from about 1.0 to about 100 mg./kg. of body weight. The novel compounds together with pharmaceutical carriers can be employed in unit dosage forms such as solids, for example, tablets or capsules, or liquid solutions, suspensions, or elixirs for oral administration and ingestion or liquid solutions, suspensions, emulsions and the like for parenteral use. The pharmaceutical carrier can be conventional pharmaceutical carriers such as sterile liquids, e.g., water, saline or aqueous dextrose for parenteral dosage forms. The quantity of active ingredient in each dosage will generally differ depending on the type of unit dosage, the type of animal and its weight. Thus, each dosage can contain from about 1 mg. to 1000 mg. of active ingredient in a significant quantity of pharmaceutical carrier.

A preferred mode of administration is parenterally such as by normally liquid injectable compositions, e.g., for intramuscular or subcutaneous administration. In such compositions the quantity of active ingredient can vary from about 0.05% to 20% by weight of the composition. The parenteral composition can be a solution, suspension or emulsion in conventional pharmaceutical carriers, e.g., sterile liquids such as water, saline, and aqueous dextrose (glucose) and related sugar solutions.

A preferred mode of administration for the compounds (active ingredient) of this invention is parenterally such as by normally lqiuid injectable compositions, e.g., for intramsucular or subcutaneous administration. In such compositions the quantity of active ingredient can vary from about 0.05% to 20% by weight of the composition and preferably from about 0.1% to 10% by weight. In order to minimize or eliminate irritation at the site of injection, the parenteral compositions can contain a non-ionic surfactant such as those having an HLB (hydrophile-lipophile balance) of about 12 to 17. Such formulations can be solutions, suspensions or emulsions in conventional liquid pharmaceutical carriers, e.g., sterile liquids such as water, saline, and aqueous dextrose (glucose) and related sugar solutions. The quantity of surfactant in the formulation can vary from about 5% to 15% by weight of the formulation. The quantity of a compound of this invention, either in the base form or a pharmaceutically acceptable acid addition salt in such formulations, can vary over a broad range such as that mentioned hereinbefore, i.e., 0.05% to 20% by weight of the formulation. Preferably, the active ingredient is in the base form. The remaining component or components of such formulations can be a normally liquid pharmaceutical carrier, e.g., isotonic aqueous saline, either alone or together with conventional excipients for injectable compositions. The surfactant can be a single surfactant having the above indicated HLB or a mixture of two or more surfactants wherein such mixture has the indicated HLB. The following surfactants are illustrative of those which can be used in such formulations: (A) Polyoxyethylene derivatives of sorbitan fatty acid esters, such as the Tween series of surfactants, e.g., Tween 80, and the like. The Tweens are manufactured by Atlas Powder Company. (B) High molecular weight adducts of ethylene oxide with a hydrophobic base formed by the condensation of propylene oxide with propylene glycol, e.g., Pluronic F–68 which is manufactured by Wyandotte Chemical Company. The preferred surfactant is Polysorbate 80, U.S.P., a polyoxyethylene sorbitan monooleate.

Illustrative of the antiviral activity of these compounds the survival time of mice, inoculated with a fatal dose of encephalomyocarditis, was prolonged by daily subcutaneous administration of bis(5-dimethylamino-2,2-dimethylpentyl) fluorene-2,7-dicarboxylate dihydrochloride. The subcutaneous administration was by injection of this active ingredient at a dose level of 50 mg./kg. for each injection at 28, 22 and 2 hours prior to inoculation with the virus and 2, 20 and 26 hours after inoculation. The injectable composition contained the active ingredient dissolved in sterile water containing 0.15% of hydroxyethylcellulose.

The compounds of this invention can be prepared by a variety of procedures such as:

(1) (A) The reduction of the corresponding fluorenone bis-basic esters or salts thereof the formula:

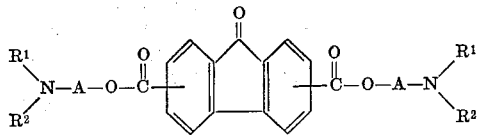

wherein each of A, $R^1$ and $R^2$ have the same meaning as in the compounds of Formula I. Preparation of fluorenone bis-basic esters is described by D. N. Rindsberg, "Dialkamine Esters of Fuorenone-2,7-Dicarboxylic Acid as Local Anesthetics," Chem. E. Thesis, University of Cincinnati, 1941; also, the preparation of many such basic esters is shown in United States patent application Ser. No. 720,332, filed on Apr. 4, 1968 in the name of R. F. Krueger et al.

(B) The reduction of the fluorenones can be carried out either chemically or by hydrogenation in the presence of a catalyst except that (a) in the case of olefinic derivatives, methods must be used which do not destroy the unsaturation and (b) those primary and secondary amino derivatives which would rearrange to the corresponding amide derivatives as their free bases must be protected from rearrangement such as by maintaining them as their salts or protecting the amino groups with blocking groups during the reduction. Suitable blocking groups are carbobenxoy, p-toluenesulfonyl, triphenylmethyl, and the like which can be removed after reduction by anhydrous hydrobromic acid, hydrobromic acid and phenol, hydrogenation under acidic conditions, and the like.

(C) Hydrogenation of the fluorenone bis esters takes place in a stepwise fashion. Thus, at room temperature and at low pressure, one equivalent of hydrogen is rapidly absorbed to give the fluorenol derivative. Subsequent uptake of hydrogen is much slower so that if the fluorene derivative is desired, the reaction mixture should be heated to shorten the reaction periods. The hydrogenation can be carried out in any of a variety of solvents such as water, alcohols such as ethanol or methanol, dimethylformamide, a mixture of these solvents, et cetera. The fluorenone compound is hydrogenated in the acid addition salt form. Hydrogenation catalysts such as palladium or platinum, supported or unsupported, may be used in this hydrogenation.

(D) The fluorenol compounds of this invention may be prepared by the chemical reduction of the corresponding base form of the fluorenone derivatives (I) such as with sodium borohydride, lithium borohydride, and the like, at 0°–100° C. for 10 minutes to 4 hours in a suitable solvent such as water, ethanol, and the like. The fluorenone bis-basic esters may be added to the borohydride reagent, either as the base dissolved in an organic solvent such as alcohols, or as the salt in an aqueous or aqueous-alcoholic solution. In the latter case, an excess of borohydride reagent should be used to compensate for reagent consumed by neutralization of the salt. Most primary and secondary amino compounds of this invention, in order to be reduced by this method, must be protected from rearrangement to the amide by blocking the amine groups to reaction as discussed above.

(2) (A) The fluorene compounds of this invention can also be prepared by one of the many known esterification or transesterification procedures. Thus a fluorene dicarboxylic acid or a derivative thereof of the formula:

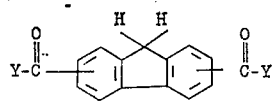

wherein Y=OH, halogen, e.g., chlorine or bromine, a (lower)alkoxy or the like can be reacted with an aminoalkanol of the formula:

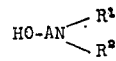

or an acid addition salt thereof where A, $R^1$, and $R^2$ are as previously defined. In the cases where $R^1$ and/or $R^2$ are hydrogen, the amine should be blocked to reactivity by the formation of a salt or by substituting it with a readily removable blocking group as previously discussed above. Condensation may be effected by reacting the fluorene dicarboxylic acid with a salt of an aminoalkanol (2 or more moles of the aminoalkanol salt per mole of the dicarboxylic acid) at 50° to 160° for a period of 6 to 72 hours in the presence of a catalyst such as p-toluenesulfonic acid, hydrochloric acid, sulfuric acid, and the like. The reaction may be run in the presence or absence of an inert solvent. Water may be removed azeotropically or by means of a water scavenger such as calcium oxide in a soxhlet apparatus attached so as to receive the vapors coming from the refluxing reaction mixture. Solvents such as xylene, toluene, dioxane, dimethylformamide, and the like can be used.

(B) Alternately, the esterification can be achieved by reacting the fluorene dicarbonyl halide with an aminoalkanol or acid addition salt thereof (2 or more moles) of the aminoalkanol or salt thereof per mole of the (dicarbonyl halide) in an inert solvent such as chloroform, benzene, tetrahydrofuran, et cetera, which is dry and free of alcohols. The reaction may be run over a wide range of temperatures and reaction times but usually between 20° C. and the reflux temperature of the solvent for 1–24 hours. The reaction is preferably run for 2 hours at the reflux temperature of the solvent.

(C) The fluorene compounds of this invention may also be produced by a transesterification reaction in which a lower alkyl ester of the fluorene dicarboxylic acid is caused to react with the appropriate aminoalkanol under suitable conditions. This type of reaction is catalyzed by alkaline or acid catalysts, e.g., toluene sulfonic acid, and is reversible. The compounds of this invention may be produced by causing the equilibrium to be shifted by removing the lower alkanol product of the equilibrium or by employing a large excess of the aminoalkanol. Preferably the reaction is carried out by removing the lower alkanol component when $R^1$ and $R^2$ are not hydrogen, with the use of an alkaline catalyst. When $R^1$ or $R^2$ is hydrogen, an acid catalyst is used. The lower alkanol may be removed by direct distillation or distillation with a suitable solvent. Suitable alkaline catalysts are alkali metals, sodium or potassium; alkali lower alkoxides, such as sodium methoxide or sodium ethoxide; alkali amides such as lithium or sodium amide; et cetera. Suitable solvents are those forming an azeotropic distillation mixture with the lower alkanol, for example, benzene or toluene, or a solvent which boils sufficiently higher than the alkanol to permit removal of the alkanol by distillation at a temperature below that of the boiling range of the solvent.

(3) A further method for the preparation of the fluorene or fluorenol compounds of this invention consists in reacting the fluorene or fluorenol dicarboxylic acid or a reactive salt there of such as the sodium or silver salt with an aminoalkyl halide or a reactive ester of an aminoalkanol, or salts thereof where the aminoalkyl portion is defined as above. The reaction can be run at temperatures ranging from room temperature to the refluux temperature of the solvent and for periods ranging from several hours to 5 days. The reaction may be run in the presence or absence of catalysts such as benzyltrimethylammonium chloride. The catalysts may be present in stoichiometric or merely catalytic amounts. The reaction is preferably run in the presence of a catalytic amount of benzyltrimethylammonium chloride for 6–18 hours at reflux temperature in isopropyl alcohol.

(4) Still another method for preparing the compounds of this invention consists in the reaction of a fluorene or fluorenol ω-haloalkyl diester of the formula:

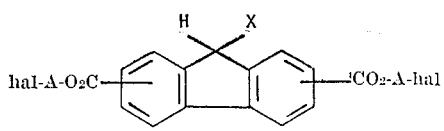

wherein X is H or OH, A is as previously defined, and hal is chlorine, bromine, or iodine; with 2 or more equivalents of an amine of the formula:

$$HN\begin{smallmatrix}R^1\\R^2\end{smallmatrix}$$

wherein $R^1$ and $R^2$ are as previously defined in Formula I except that neither $R^1$ nor $R^2$ may be hydrogen. The preferred halogen in the above formula is bromine or iodine. The reaction is run in the presence of an acid acceptor such as an inorganic base (preferably sodium or potassium carbonate) or organic bases such as an excess of the amine being used for the reaction. The reaction may be run with or without a catalyst such as potassium iodide and with or without a suitable solvent such as toluene, dioxane, et cetera. The reaction can be run at 50 to 150° C. for a period of 6 to 72 hours.

The following examples are illustrative of the invention:

EXAMPLE 1

Preparation of bis (5-dimethylamino-2,2-dimethylpentyl) fluorene-2,7-dicarboxylate dihydrochloride A solution of 20.0 g. (0.0321 mole) of bis (5-dimethylamino - 2,2 - dimethylpentyl) 9-oxofluorene-2,7-dicarboxylate dihydrochloride in water (total volume=240 cc.) was hydrogenated over 8.0 g. of 10% palladium on charcoal for 2 days at 53° C. on a Parr hydrogenation apparatus. The reaction mixture was decanted from the catalyst, filtered through filter aid, treated with charcoal and again filtered. This solution was made basic to phenolphthalein with 20% NaOH and extracted three times with $CHCl_3$. The combined extracts were washed twice with water, dried over anhydrous $Na_2SO_4$, filtered and the filtrate made acid to congo red with ethereal HCl. Most of the solvent was removed on the steam bath under vacuum and the resulting solid recrystallized from methanol-ether and from absolute ethanol. The title compound thus obtained was then dried for 4 hours under high vacuum at 80° C., M.P. 294–295° C. (gas evolution), $\lambda_{max.}^{0.1N\ HCl}$ 317 m$\mu$, $E_{1\ cm.}^{1\%}$ 640

The following bis-(aminoalkyl)-fluorene-2,7-dicarboxylates were prepared by substantially the same procedure as that of Example 1 by hydrogenating the corresponding 9-oxofluorene:

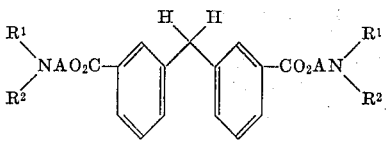

| A | $\begin{smallmatrix}R^1\\N\\R^2\end{smallmatrix}$ | M.P. (° C.) | $\lambda_{max.}$ (m$\mu$) | $E_{1\ cm.}^{1\%}$ | Solvent |
|---|---|---|---|---|---|
| $(CH_2)_2$ | $CH_3$  $\cdot HCl$ | 254 (dec.)[1] | 318 | 639 | Water. |
| $(CH_2)_3$ | $N(C_2H_5)_2 \cdot HCl$ | 263 (dec.) | 318 | 701 | Do. |
| $(CH_2)_3$ | $N(n\text{-butyl})_2 \cdot HCl$ | 183.5–184 | 317 | 669 | Ethanol. |
| $(CH_2)_3$ | $N(i\text{-pentyl})_2 \cdot HCl$ | 195.5–197 | 318 | 529 | 0.1 N HCl. |
| $(CH_2)_6$ | $N(C_2H_5)_2 \cdot HCl$ | 227.5–228.5 | 317 | 576 | 0.1 N HCl. |

[1] Contains about 1% water.

EXAMPLE 2

Preparation of bis (3-diethylaminopropyl)-fluorene-2,5-dicarboxylate dihydrochloride Fluorene-2,5-dicarbonyl chloride (6.4 g., 0.022 mole) is dissolved in 150 ml. of $CHCl_3$ (dry and ethanol-free), warmed on the steam bath and treated with a solution of 5.8 g. (0.044 mole) of 3-diethylamino-1-propanol dissolved in 50 ml. of $CHCl_3$. The resulting solution is refluxed for 5 hours, treated with charcoal, filtered and the filtrate treated with anhydrous ether. The resulting semisolid is separated from the supernatant, dried at 40° C. overnight under vacuum and recrystallized twice from $CHCl_3$-EtOAc to give the desired product, M.P. 202–203°, $\lambda_{max.}^{EtOH}$ 315 m$\mu$, $E_{1\ cm.}^{1\%}$ 349

EXAMPLE 3

Preparation of bis (3-diethylaminopropyl)-fluorene-1,7-dicarboxylate dihydrochloride sesquihydrate This compound was prepared in a manner similar to that described in Example 2. The intermediate bis acid chloride melted at 196–197°, and the bis ester product melted at 246–247°, $\lambda_{max.}^{EtOH}$ 281 m$\mu$, $E_{1\ cm.}^{1\%}$ 419

EXAMPLE 4

Preparation of bis (3-diallylaminopropyl) 9-hydroxyfluorene-2,7-dicarboxylate dihydrochloride hydrate A solution of 12.3 g. (0.020 mole) of bis (3-diallylaminopropyl) 9-oxofluorene-2,7-dicarboxylate dihydrochloride in 350 ml. of warm water was cooled to room temperature and added to 3 g. (0.079 mole) of NaBH$_4$ in 15 ml. of water with swirling. The resulting product was extracted 5 times with ether, and the combined ether extracts were washed with water, then with NaCl solution, and dried over anhydrous MgSO$_4$. The mixture was filtered, the filtrate treated with ethereal HCl and most of the solvent distilled off. The residue was dissolved in 50 ml. of hot ethanol, filtered through filter aid and the filtrate refrigerated. The crystallized solid was filtered off and was recrystallized twice from ethanol to give the desired product containing approximately 1% water, M.P. 213.5–215.5°

$\lambda_{max.}^{H_2O}$ 304 m$\mu$, $E_{1\,cm.}^{1\%}$ 520

The following bis-(aminoalkyl)-9-hydroxy fluorene-2,7-dicarboxylates were prepared by a similar procedure:

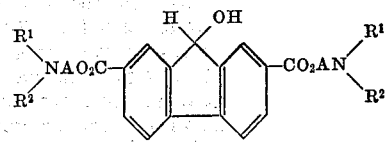

| A | R$^1$ N R$^2$ | M.P. (° C.) | $\lambda_{max.}$ (m$\mu$) | $E_{1\,cm.}^{1\%}$ | Solvent |
|---|---|---|---|---|---|
| (CH$_2$)$_2$ | CH$_3$ N-◇-.HCl | 250–251 (dec.) | 305 | 531 | Water. |
| (CH$_2$)$_3$ | N(CH$_2$CH$_3$)$_2$.HCl | 213–214 [1] | 304 | 566 | Do. |
| (CH$_2$)$_3$ | N(CH$_2$CH$_2$CH$_3$)$_2$.HCl | 176.5–178 | 304 | 477 | Do. |
| (CH$_2$)$_3$ | N(i-pentyl)$_2$.HCl | 175–178 [2] | 303 | 429 | Ethanol. |
| (CH$_2$)$_6$ | N(CH$_2$CH$_3$)$_2$ | 92.5–93.5 | 303 | 578 | Do. |

[1] Hemihydrate.
[2] The starting material used to prepare this compound was insoluble in water and was therefore dissolved in 1:1 dioxane-water for reaction with NaBH$_4$.

EXAMPLE 5

By the method of Example 1, using (a) bis (3-piperidinopropyl) 9-oxofluorene-2,7-dicarboxylate dihydrochloride; and (b) bis (4-pyrrolidinobutyl) 9-oxofluorene-2,7-dicarboxylate dihydrochloride, as starting materials, the following compounds respectively can be prepared:

(a) Bis (3 - piperidinopropyl) fluorene-2,7-dicarboxylate dihydrochloride; and
(b) Bis (4 - pyrrolidinobutyl) fluorene-2,7-dicarboxylate dihydrochloride.

EXAMPLE 6

By the method of Example 4, using (a) bis (3-piperidinopropyl) 9 - oxofluoroene - 2,7 - dicarboxylate dihydrochloride; and (b) bis (4-pyrrolidinobutyl) 9-oxofluorene-2,7-dicarboxylate dihydrochloride as starting materials, respectively, the following compounds can be prepared:

(a) Bis (3 - piperidinopropyl) 9 - hydroxyfluorene-2,7-dicarboxylate dihydrochloride; and
(b) Bis (4-pyrrolidinobutyl) 9-hydroxyfluorene-2,7-dicarcarboxylate dihydrochloride.

EXAMPLE 7

Preparation of bis (5-amino-2,2-dimethylpentyl) fluorene-2,7-dicarboxylate dihydrochloride A solution of bis (5-amino-2,2-dimethylpentyl) 9-oxofluorene-2,7-dicarboxylate dihydrochloride in ethanol can be hydrogenated in the manner described for Example 1. The compound is maintained in the salt form and is isolated by concentrating the reaction solution, cooling, and precipitating the product with anhydrous ether. The pure substance can be obtained by recrystallizing from methanol-ether or isopropyl alcohol.

EXAMPLE 8

Preparation of bis (5-ethylamino-2,2-dimethylpentyl) fluorene-2,7-dicarboxylate dihydrochloride This compound can be prepared from bis (5-ethylamino - 2,2 - dimethylpentyl) 9-oxofluorene-2,7-dicarboxylate dihydrochloride in the manner described in Example 7.

The following examples show the preparation of intermediates which are used as starting materials in the preparation of compounds of this invention.

(A) Preparation of fluorene-2,5-dicarboxylic acid.—To a stirred suspension of 47.5 g. (0.354 mole) of anhydrous AlCl$_3$ and 25.0 g. (0.118 mole) of fluorene-4-carboxylic acid in 700 ml. of CS$_2$ chilled to 0° was slowly added 45.0 g. (0.354 mole) of oxalyl chloride in 200 ml. of CS$_2$. After 6 hours at 0° C., an additional 16 g. (0.118 mole) of anhydrous AlCl$_3$ and 45.0 g. (0.354 mole) of oxalyl chloride was added, and the reaction mixture was allowed to stir for 64 hours at room temperature. After the normal workup of a Friedel-Crafts reaction, there was obtained 25 g. of fluorene-2,5-dicarboxylic acid, M.P. >360° C.

(B) Preparation of fluorene-2,5-dicarbonyl chloride.— Fluorene-2,5-dicarboxylic acid (13.0 g., 0.051 mole) was added to 150 ml. of thionyl chloride followed by the addition of 2 drops of dry pyridine. This mixture was refluxed for 4 hours and the excess thionyl chloride removed by distillation. The crude product was dissolved in CHCl$_3$, treated with charcoal, filtered, the filtrate treated with 75–90° C. petroleum ether and the solvent allowed to evaporate on the steam bath under a stream of nitrogen. The product which crystallized was filtered and recrystallized from CCl$_4$ (including charcoal treatment) to give the desired product, M.P. 154–156° C.

(C) Preparation of bis (5-amino-2,2-dimethylpentyl) 9-oxofluorene-2,7-dicarboxylate dihydrochloride hydrate.— A solution of 9.4 g. (0.0717 mole) of 5-amino-2,2-dimethyl-1-pentanol in 360 ml. of dry chloroform (ethanol-free) was treated with ethereal hydrogen chloride (0.107 mole) and then with 10.88 g. (0.0357 mole) of 9-oxofluorene-2,7-dicarbonyl chloride. This mixture was stirred and refluxed for 27 hours. After standing at room temperature for 3 days, the gummy precipitate was filtered, treated with boiling isopropyl alcohol, filtered, and the filtrate placed under vacuum at room temperature overnight. The residue was treated with acetone, filtered and the product recrystallized from methanol-dry ether, then from water-acetone, and dried to give bis-(5-amino-2,2-dimethylpentyl) 9-oxofluorene-2,7-dicarboxylate dihydrochloride hydrate, M.P. 245° dec.

$\lambda_{max.}^{water}$ 276 $E_{1 \, cm.}^{1\%}$ 1640

(D) Preparation of bis (3-di-n-butylaminopropyl) 9-oxofluorene-2,7-dicarboxylate dihydrochloride.—A mixture of 13.5 g. (0.05 mole) of 9-oxofluorene-2,7-dicarboxylic acid and 47.0 g. (0.23 mole) of 3-di-n-butylaminopropyl chloride in 500 ml. of isopropyl alcohol was stirred and refluxed for 19 hours. The hot reaction mixture was filtered, concentrated under reduced pressure to a volume of 150 ml. and treated with 1000 ml. of ether. The precipitate which formed was filtered, recrystallized from acetone-methanol, dried and exposed to the atmosphere to give bis (3-di-n-butylaminopropyl) 9-oxofluorene-2,7-dicarboxylate dihydrochloride monohydrate, M.P. 179–180°.

EXAMPLE 9

An illustrative composition for a parenteral injection is the following wherein the quantities are on a weight to volume basis.

(a) Bis-(4-dibutylaminopropyl) 9-hydroxyfluorene-2,7-dicarboxylate dihydrochloride hemihydrate—100 mg.
(b) Sodium chloride q.s.
(c) Water for injection to make—10 ml.

The composition is prepared by dissolving the active ingredient and sufficient sodium chloride in water for injection to render the solution isotonic. The composition may be dispensed in a single ampule containing 100 mg. of the active ingredient for multiple dosage or in 10 ampules for single dosage.

EXAMPLE 10

An illustrative composition for a parenteral injection is the following aqueous emulsion.

| Each ml. (milliliter) contains— | Ingredient | Amount |
| --- | --- | --- |
| 25 mg | Bis (3-diethylaminopropyl) fluorene-1,7-dicarboxylate dihydrochloride sesquihydrate. | 0.50 g. |
| 100 mg | Polysorbate 80 | 2.000 g. |
| 0.0064 mg | Sodium chloride | 0.128 g. |
|  | Water for injection, q. s | 20.000 ml. |

The composition of Example 10 is prepared by: dissolving 0.64 grams of sodium chloride in 100 ml. of water for injection; mixing the Polysorbate 80 with the active ingredient; adding a sufficient solution of the sodium chloride in water to the active ingredient and Polysorbate to make 20 ml.; shaking the mixture; and then autoclaving it for 20 minutes at 110° C. at 15 p.s.i.g. steam pressure. The composition can be dispensed in a single ampule for multiple dosage or in 10 or 20 ampules for single dosages.

What is claimed is:
1. A compound of the formula

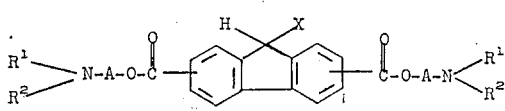

wherein:
(A) each of $R^1$ and $R^2$ is hydrogen, (lower)alkyl, cycloalkyl of 3 to 6 ring carbon atoms, alkenyl of 3 to 6 carbon atoms or each set of $R^1$ and $R^2$ taken together with the nitrogen to which they are attached is pyrrolidino, piperidino, N-(lower)alkylpiperazino or morpholino;
(B) each A is alkylene of 2 to about 8 carbon atoms and separates its adjacent oxygen and nitrogen atoms by an alkylene chain of at least 2 carbon atoms; and
(C) X is H; or a pharmaceutically acceptable acid addition salt thereof.

2. A compound of the formula

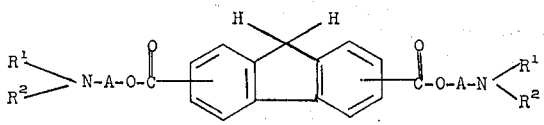

wherein:
(A) each of $R^1$ and $R^2$ is (lower)alkyl, cycloalkyl of 3 to 6 ring carbon atoms or alkenyl of 3 to 6 carbon atoms;
(B) each A is alkylene of 2 to 6 carbon atoms and separates its adjacent oxygen and nitrogen by an alkylene chain of at least 2 carbon atoms; or a pharmaceutically acceptable acid addition salt thereof.

3. A compound of claim 2 wherein each of $R^1$ and $R^2$ is (lower)alkyl and the aminoalkyleneoxycarbonyl groups are in the 2- and 7-positions of the fluorene ring.

4. A compound of claim 2 which is bis[2-(N-cyclohexyl-N-methylamino)ethyl]fluorene-2,7-dicarboxylate or a pharmaceutically acceptable acid addition salt thereof.

5. A compound of claim 2 which is bis(3-diethylaminopropyl)fluorene-1,7-dicarboxylate or a pharmaceutically acceptable acid addition salt thereof.

6. A compound of claim 3 which is bis(3-diethylaminopropyl)fluorene-2,7-dicarboxylate or a pharmaceutically acceptable acid addition salt thereof.

7. A compound of claim 3 which is bis(5-dimethylamino-2,2-dimethylpentyl)fluorene-2,7-dicarboxylate or a pharmaceutically acceptable acid addition salt thereof.

8. A compound of claim 3 which is bis(3-dibutylaminopropyl)fluorene-2,7-dicarboxylate or a pharmaceutically acceptable acid addition salt thereof.

References Cited

Rindsberg: Chem. E. Thesis, University of Cincinnati, 1941.

LORRAINE A. WEINBERGER, Primary Examiner

E. J. SKELLY, Assistant Examiner

U.S. Cl. X.R.

260—247.2 B, 268, 294.3 A, 326.3, 473 F; 424—248, 250, 268, 274, 308

PO-1050
(5/69)

UNITED STATES PATENT OFFICE
CERTIFICATE OF CORRECTION

Patent No. 3,647,860  Dated  March 7, 1972

Inventor(s) Arthur D. Sill and Robert W. Fleming

It is certified that error appears in the above-identified patent and that said Letters Patent are hereby corrected as shown below:

Column 2, line 71, "groups are" should read "groups as".
Column 4, line 33, "lqiuid" should read "liquid".
Column 5, line 42, "carbobenxoy" should read "carbobenzoxy".
Column 7, line 3, "refluux" should read "reflux". Column 8, formula at line 24 should read

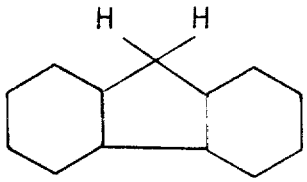

Column 9, in table appearing between lines 25-47, "176.5-178°" should read "176.5-178°¹"; column 9, line 60, "oxofluoroene" should read "oxofluorene".

Signed and sealed this 1st day of October 1974.

(SEAL)
Attest:

McCOY M. GIBSON JR.　　　　　　　　C. MARSHALL DANN
Attesting Officer　　　　　　　　　Commissioner of Patents